United States Patent
Vincent

(10) Patent No.: US 7,246,078 B2
(45) Date of Patent: Jul. 17, 2007

(54) SYSTEM AND METHODS FOR GRAPHICALLY REPRESENTING PURCHASE PROFILES AND SALES GUIDANCE TO A CUSTOMER SERVICE REPRESENTATIVE

(75) Inventor: Perry G. Vincent, Irmo, SC (US)

(73) Assignee: NCR Corporation, Dayton, OH (US)

( * ) Notice: Subject to any disclaimer, the term of this patent is extended or adjusted under 35 U.S.C. 154(b) by 1313 days.

(21) Appl. No.: 09/729,540

(22) Filed: Dec. 4, 2000

(65) Prior Publication Data

US 2002/0069101 A1  Jun. 6, 2002

(51) Int. Cl.
G06F 17/30 (2006.01)

(52) U.S. Cl. .................................................. 705/10
(58) Field of Classification Search .................. 705/10
See application file for complete search history.

(56) References Cited

U.S. PATENT DOCUMENTS

| | | | | |
|---|---|---|---|---|
| 5,634,101 A * | 5/1997 | Blau | ........................ | 705/10 |
| 5,930,764 A * | 7/1999 | Melchione et al. | ........... | 705/10 |
| 6,061,658 A * | 5/2000 | Chou et al. | ................. | 705/10 |
| 6,331,855 B1 * | 12/2001 | Schauser | ................... | 345/502 |
| 6,370,513 B1 * | 4/2002 | Kolawa et al. | ............... | 705/10 |
| 6,505,168 B1 * | 1/2003 | Rothman et al. | ............. | 705/10 |
| 6,519,571 B1 * | 2/2003 | Guheen et al. | ............... | 705/14 |
| 6,708,155 B1 * | 3/2004 | Honarvar et al. | .............. | 705/7 |

FOREIGN PATENT DOCUMENTS

WO  WO 9922328  *  3/1999

OTHER PUBLICATIONS

Teradata Retail Decision White Paper, © 2001 NCR Corporation.
Teradata CRM (Customer Relationship Management) Version 5 Functional Overview, Aug. 2003.

* cited by examiner

Primary Examiner—Romain Jeanty
(74) Attorney, Agent, or Firm—Dinsmore & Shohl; James M. Stover

(57) ABSTRACT

Methods and systems for representing a customer's product purchasing profile to a customer service representative in an automated customer relationship management environment is provided which includes identifying a set of products for a sales campaign, identifying one or more relationships between the products within the set of products and representing each product from within the set by a distinct image in a graphical display. The product images are visually distinguished in the graphical display based upon the identified product relationships. A propensity of the customer to purchase each unowned product may be determined based upon one or more demographic attributes of the customer, and the product images distinguished in the display based upon the determined purchase propensities.

17 Claims, 5 Drawing Sheets

SYSTEM AND METHODS FOR GRAPHICALLY REPRESENTING PURCHASE PROFILES AND SALES GUIDANCE TO A CUSTOMER SERVICE REPRESENTATIVE

TECHNICAL FIELD

The present invention relates to a customer relationship management system and, more particularly, to a system and methods for providing real-time graphical representations of customer purchase profiles and product sales guidance to a customer service representative in an automated customer relationship management environment.

BACKGROUND OF THE INVENTION

Today businesses are increasingly using outbound contact campaigns over a variety of channels such as e-mail, facsimile, regular postal mail, telephonic communication and the like, to market their products and services. Of these various channels, telephonic communications is the most popular and widely preferred contact campaign channel used to reach consumers.

Typically, a business will identify a service or product which it desires to market to consumers. A market analyst will then identify individuals which are believed to be likely candidates for purchasing the service or the product. The individual names and telephone numbers of these identified consumers may be acquired from a variety of sources, such as organizations external to the selling business, which compile and sell large amounts of information about consumers, internal customer data stores controlled by the selling business, and the like.

Often business or marketing analysts will mine a plurality of internal data stores using a variety of existing automated customer relationship management tools, such as, for example, NCR Corporation's Relationship Optimizer™ solution, in order to define appropriate profiles of potential customers, and to correspondingly restrict the contact campaign to the potential customers matching the profiles. These data stores typically consist of historical information gathered from past campaigns and historical customer information collected during past interactions of all types with the customer, such as prior purchases, credit applications, web site interactions, and others.

After a campaign is identified, and a contact list created, a variety of existing automated software packages permit the campaign to be automatically managed, placing calls to the targeted customers and connecting the calls (after the customer answers) to the next available customer service representative. For example, the contact list may be electronically provided to a Computer Telephony Integration (CTI) software package (e.g. Genesys, Geotel, and the like), wherein a record for each contact is maintained electronically and logically hooked to a customer database where additional information about a contacted customer may be acquired and provided to the representative during the contact. The CTI packages typically do not require representative's to dial any telephone numbers, rather contact with a potential customer is handled automatically by the package.

In addition to using CTI's, businesses with outgoing contact campaigns often utilize any one of a variety of internal business front office applications, such as, for example, Vantive, SilkNet, Siebel, ONYX, and Clarify to manage the internal operational aspects of the campaign. These front office application's typically permit modifications to fields in the internal customer database, and provide a wide range of electronic screens that appear on a representative's workstation display in real-time when a call is delivered to a representative, in order to provide the representative with a range of additional information about the potential customer. This additional information will have been previously mined from the data stores and analyzed to determine that most useful to the representative, such as customer preferences, marketing segments, and the like.

As front office applications and data mining techniques become increasingly more sophisticated, these software applications are providing representative's with ever increasing amounts of data in real-time regarding customer contacts. This data may include demographic information about the potential customer, past purchase history, customer value to the business, and the like. Accordingly, to accommodate all the available information often many screens or windows within the same front office application must be consulted by the representative prior to or during a customer contact in order for the representative to fully synthesize the data into a mental image of the types of products purchased by the customer in the past, as well as those most likely to be purchased during the present interaction. Furthermore, the information is often presented as text fields or lists on the representative's workstation screen, requiring the representative to read through the information in order to assimilate it.

While the large amounts of available data increase the business's potential for a successful outcome with each contacted customer, it also decreases the efficiency of each representative by increasing the amount of time spent by the representative on each contact. The increased time per contact decreases the number of potential contacts a representative is able to reach within a given time period, and also may hinder sales to existing contacts, who may become irritated or turned off by the slower pace at which the representative is able to conduct the interaction. Thus, decreasing the efficiency of the representative negatively impacts the business, by reducing the total number of potential customer contacts and, therefore, successful contacts that can be achieved by the representative during a given time period.

Aside from outbound call campaigns, representative's who deal directly with potential customers in face-to-face transactions, such as in a retail store or bank, also frequently have a need for detailed, personalized information regarding the customer and the customer's past purchases, as well as related products and services. As with representative's in a call center, this customer information is typically presented to the representative through a front office application, in which the representative must read through multiple windows or screens, with the customer present, in order to assimilate the customer's data. As in the call center environment, this need to review data across multiple windows or screens while actively engaged with the customer tends to reduce the efficiency of the representative, and reduce the potential for successful sales.

Accordingly, to enable a customer service or sales representative to assimilate a large amount of customer data while simultaneously maintaining a high level of customer contacts and successful transactions, it is desirable to provide the customer data in a format in which it can be easily reviewed and assimilated by the representative. In particular, it is desirable for the representative to be able to quickly and efficiently identify the products or services previously purchased by the customer, as well as other related products or services most likely to be purchased by the customer during the interaction. In addition, it would be beneficial for the customer data to be visually presented to the representative in a graphical, summarized format, to reduce the time required to assimilate the data, and to enable the representative to capture "at a glance" a comprehensive understanding of the customer and their purchasing history and propensities. Further, it is desirable to not only present graphically summarized customer data to a representative, but also to suggest a sales approach based upon the data.

SUMMARY OF THE INVENTION

Accordingly, it is an object of the present invention to provide a system and methods for graphically representing customer purchasing profiles in an automated customer relationship management environment.

In particular, it is a primary object of the present invention to provide a system and methods for summarizing customer product ownership data, inter-product relationships, and purchasing propensities into a graphical display to enable a customer service representative to easily and quickly assess the value of a customer contact, as well as the types of products or services most likely to be purchased by the customer.

It is another object of the present invention to provide such a system and methods in which the purchasing profile data is logically modeled as a two-dimensional map of product images.

It is yet another object of the present invention to provide such a system and methods in which the various product images are visually distinguished based upon a customer's purchasing propensity.

It is still another object of the present invention to provide such a system and methods in which inter-product relationships are graphically represented.

It is a further object of the present invention to provide graphical representations of customers' purchase profiles in which products are represented by visual images, and in which selecting an image launches a sales script corresponding to the product.

Additional objects and other novel features of the invention will be set forth in part in the description that follows, and in part will become apparent to those skilled in the art upon examination of the following, or may be learned with the practice of the invention.

To achieve the foregoing and other objects, and in accordance with a first aspect of the present invention, a method of representing a customer's product purchasing profile to a customer service representative in an automated customer relationship management environment is provided comprising identifying a set of products for a sales campaign, identifying one or more relationships between the products within the set of products, and representing each product from within the set by a distinct image in a graphical display. The product images are visually distinguished in the graphical display based upon the identified product relationships.

In accordance with a second aspect of the present invention, a method of graphically representing product ownership profiles and sales guidance to a customer service representative in an automated customer relationship management environment is provided comprising identifying a customer who is associated with one or more demographic attributes and accessing purchasing data for the customer from a data store. The purchasing data including products owned by the customer and products related by one or more factors to the owned products. A propensity of the customer to purchase each of the related products is determined based upon one or more of the demographic attributes. Each of the owned and related products is represented by a visual image, and the visual images are mapped into a graphical display. The product images in the display are visually distinguished based upon the determined purchase propensities of the customer.

In accordance with a third aspect of the present invention, a computerized system for graphically representing a customer's product ownership profile and sales guidance to a customer service representative in an automated customer relationship management environment is provided comprising a workstation display screen and one or more images on the display screen which represent products. Each of the product images is mapped into a two-dimensional graphical display. An indicating device is provided and is movable between the product images on the display. The product images are depicted using a plurality of different visual criteria in order to distinguish between the products based upon a number of different factors. Additionally, distinct visual criteria may be utilized to designate relationships between the products and purchase propensity levels for the products.

Still other objects and advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects, all without departing from the invention. Accordingly, the drawings and descriptions will be regarded as illustrative in nature and not as restrictive.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE PREFERRED EMBODIMENTS

Reference will now be made in detail to the present preferred embodiments of the invention, examples of which are illustrated in the accompanying drawings, wherein like numerals indicate the same elements throughout the views. As will be appreciated, the present invention, in its most preferred form, is directed to methods and systems for providing an "at a glance" summary of customer product purchasing profiles and purchasing propensities to a customer service or sales representative, to enable the representative to quickly assimilate the customer information and assess the value of pursuing the customer contact. One embodiment of the present invention is implemented using NCR Corporation's InterRelate+™ customer relationship management software, customer data housed in NCR Corporation's Teradata™ data warehouse, as well as various data mining tools incorporated in NCR's Relationship Optimizer™ marketing automation solution. In addition, a CTI application, such as Genesys™, may be utilized to facilitate use of the invention in a call center environment. The operating system environment is both Windows NT and Unix. Of course, other customer relationship management solutions, data stores and operating systems (now known or hereinafter developed) may also be readily employed in the present invention without departing from the scope of the invention. Moreover, as one skilled in the art will readily appreciate, the client operating system environment may differ from the server operating system environment, and each of the various architectural components may have their own operating system environments.

Figure 1:
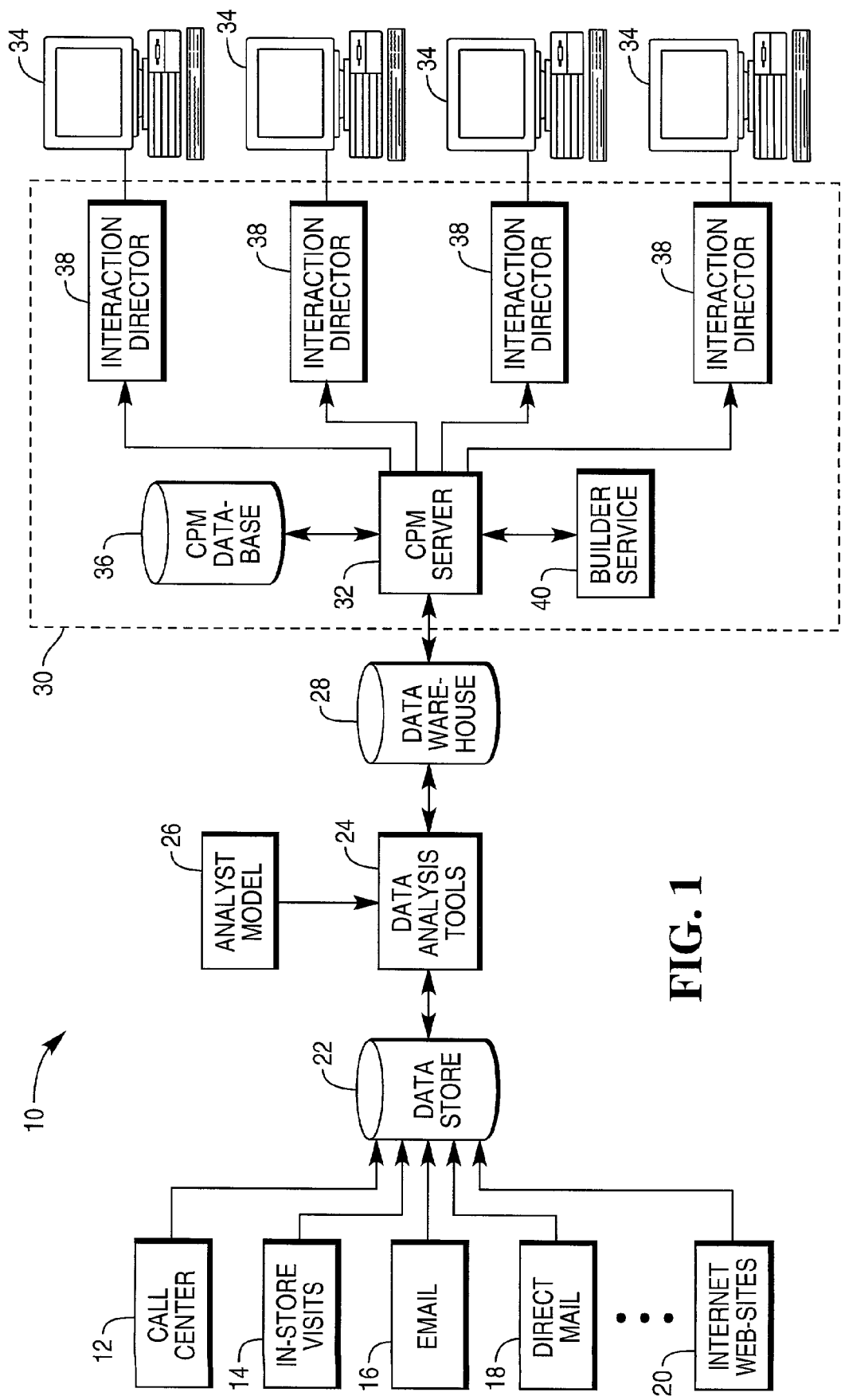
FIG. 1 is a block diagram of a system for graphically representing customer purchasing profiles in accordance with the present invention.

FIG. 1 illustrates a block diagram of an exemplary customer relationship management system 10 within which the present invention may be utilized. The system 10 is designed to enable a business to record, analyze and respond to customer interactions and behaviors in a personalized manner, in order to establish long-term relationships with its customers. As shown in FIG. 1, customer data is input to the system from any number of different sources and interaction channels. These channels may include interactions with the customer through the business's call center 12, in-store visits 14, e-mail 16, direct mailing 18 and internet web-sites 20, among others. Information collected through the various channels may include demographic data about the customer, such as gender, family size, household income, habits, hobbies, household products or services commonly purchased and used, and the like. In addition to demographic data, data regarding a customer's past purchase history is preferably collected, such as information regarding which of the business's products and services the customer has purchased or inquired about in the past. The customer's preferred interaction channel may also be input and recorded. The data input through the various channels is preferably stored as a customer record in an internal customer database or data store 22.

In order to assemble the customer data into a format in which it may be beneficially analyzed and used by the business, one or more data analysis tools 24 may be applied to the customer data store 22. The data analysis tools 24 are preferably developed solutions products which utilize sophisticated statistical algorithms and/or models to analyze and predict customer behaviors based upon past actions and characteristics, or to determine market segmentation based upon past purchasing history and demographics. Preferably, one or more customer models 26 are derived by a business or marketing analyst for use by the data analysis or mining tool 24 in determining the marketing segments and predicting customer behaviors and propensities. Using the models and algorithms, the data analysis tools 24 may determine, among other attributes, the particular marketing segments for each customer, the particular propensity or likelihood of a customer falling into a particular marketing segment to purchase certain types of products or services over other products or services, and product affinities or relationships between the various products offered by the business. An example of a data analysis tool that utilizes predictive modeling to identify product affinities is NCR Corporation's GrowthADVISOR™ product, which may be used in the present invention to identify up-sell and cross-sell product opportunities from the data in the data store 22, as well as the propensity of customers in certain defined marketing segments to purchase particular products or services of the business. However, while the GrowthADVISOR™ product is provided as an example, it is to be understood that other data analysis tools, both presently known and hereinafter developed, may also be used in conjunction with the present invention to analyze customer and product data in a manner most beneficial to the underlying business, without departing from the scope of the invention.

The data analysis tools 24 are preferably applied against the customer data store 22 on a periodic basis, such as daily, to rescore the customer data against the models, with the specific period for rescoring being based upon the needs of the business. The results of the data analysis are preferably stored in a data store or warehouse 28, such as, for example, NCR Corporation's Teredata™ data warehouse. The analyzed data from the warehouse 28 may then be used by an automated customer personalization management application, such as application 30 depicted in FIG. 1, to provide customer service or business representatives with personalized information about each customer. An example of a suitable customer personalization management application for the present invention is NCR Corporation's InterRelate+™ customer interaction solution, which utilizes customer information captured through a number of different channels to provide customer service representatives with real-time access to customer segmentation data and personalized assistance with customer interactions. The customer information and assistance from the personalization management solution may be utilized in a call center environment or in face-to-face customer transactions. While the present invention will be described with respect to its application within the InterRelate+™ solution, it is to be understood that the invention may be utilized in other customer personalization or relationship management applications, both now known and hereinafter developed, without departing from the scope of the invention.

As shown in FIG. 1, the customer personalization management application 30 preferably includes a CPM server 32 for transferring data between the data warehouse 28 and the individual customer service representative workstations 34. The CPM server 32 receives the analyzed customer interaction data from the warehouse 28 for use in personalizing the representative's customer contacts. In addition, data gathered from the representatives' customer interactions may be summarized and uploaded to the data warehouse 28 for use in refining the business's internal customer data store 22. The CPM server 32 is preferably connected to a CPM database 36, which functions as a central data store for configuration data, as will be described in more detail below. In addition to the CPM database 36, the CPM server 32 also interfaces with an Interaction Director 38, which executes on each customer service representative's workstation 34, and provides personalized screens on each workstation which correspond to the current customer contact. The CPM server 32 also preferably interfaces with a Builder Service 40 which functions as a primary configuration point for the application 30. Through the Builder Service 40, marketing personnel are able to configure the Interaction Director 38 to provide personalized presentations for each contacted customer based upon that customer's demographics or marketing segments, and also create personalized sales pitches or scripts for use by the customer service representatives. The personalized presentations and scripts are stored as configuration data in the CPM database 36. During a customer interaction, the particular sales presentation and/or scripts to be utilized by the representative will be determined in real-time, based upon the customer information obtained from the warehouse 28 and downloaded from the CPM database 36.

Figure 2:
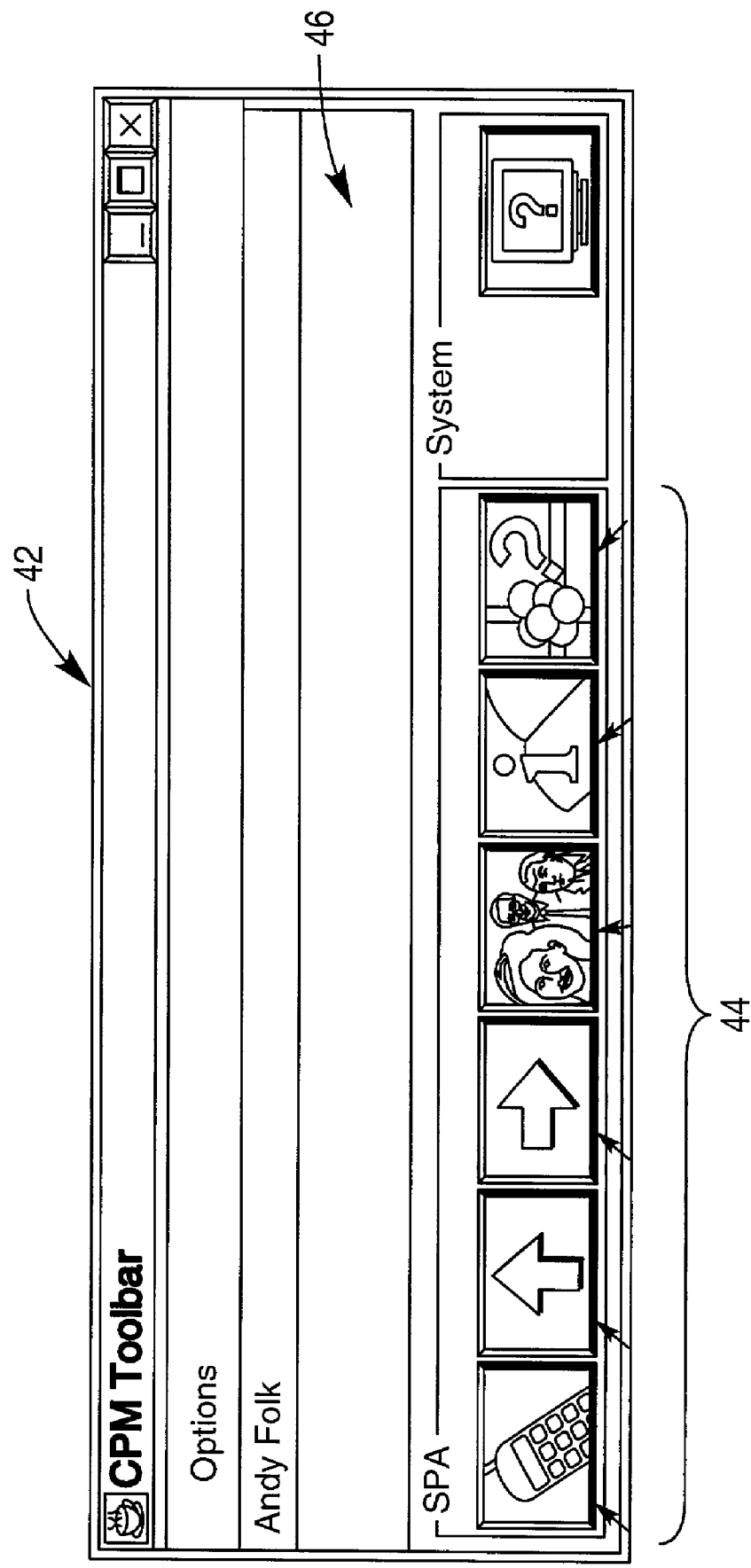
FIG. 2 is an exemplary screen display depicting a representative tool bar for an automated customer personalization management application.

As mentioned above, the Interaction Director 38 is a desktop application that executes at each workstation 34 to guide a representative through a personalized interaction with a customer. In the representative InterRelate+™ application 30, the Interaction Director 38 is a tool-bar centered application from which a representative may launch "agent assistant" applications to direct the representative through the customer interaction. FIG. 2 depicts a representative tool-bar 42 for the exemplary Interaction Director 38, in which individual icons 44 are provided corresponding to each of the available agent assistant options. In a CTI-enabled application, the tool-bar 42 may be automatically populated with icons or assistant buttons 44 based upon the customer information attached to the call routed to the representative's workstation 34. Alternatively, the assistant buttons 44 may be customized in advance for a particular workstation 34 through the Builder Service 40. During a customer interaction, the representative may select from amongst the assistant buttons 44 to launch and display scripts describing the product or services to be offered, or to retrieve information about the customer, such as products already owned, demographics, or customer value to the business. In addition to the assistant buttons 44, the tool-bar 42 includes a display screen 46 for displaying information to the representative such as the name of the customer contact or sales scripts.

Figure 3:
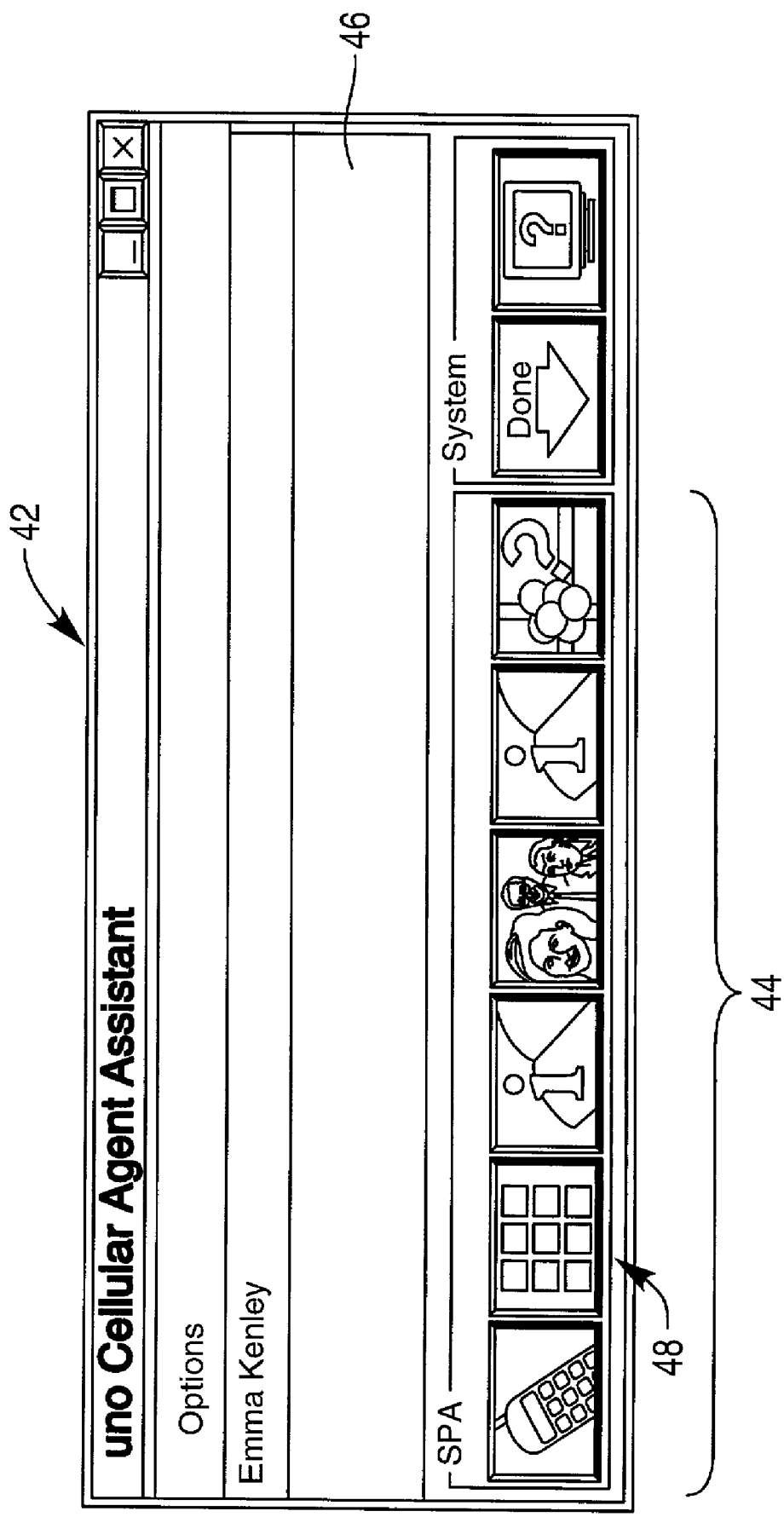
FIG. 3 is an exemplary screen display depicting a representative tool bar for an automated customer personalization management application enhanced in accordance with the present invention.

FIG. 3 depicts an exemplary tool-bar 42 and display screen 46 for the Interaction Director 38, configured in accordance with the present invention. As shown in FIG. 3, in the present invention the tool-bar 42 is enhanced to include a graphical display icon 48 depicting a product purchasing profile for the present customer contact. The graphical display icon 48 provides the customer service representative with a quick, summarized view of the customer's product ownership profile to enable the representative to make an initial decision as to the value of pursuing additional information regarding the customer. As shown in FIG. 3, in the preferred embodiment the graphical display icon 48 is composed of a two-dimensional graph of geometric images, such as, for example, the blocks 50 shown, wherein each of the images represents a different product or service. Data regarding the products to be represented in the icon 48 is obtained from the warehouse 28. The represented products are typically those products identified by the data analysis tools 24 as either past purchases of the current customer contact, or as products either related to past purchases or products likely to be purchased by the customer based upon the customer's marketing segments.

In the preferred embodiment shown, each of the product images or blocks 50 in the graphical display icon 48 is represented by a distinct visual criteria, such as color, in order to distinguish between the blocks. The particular color in which a block 50 is depicted varies depending upon the status of the associated product. In the preferred embodiment, the blocks 50 are colored according to the product ownership of the customer contact, and/or the propensity of the customer to purchase each of the represented products. For example, icon 48 may include one or more products already owned by the contacted customer, with each of these products being represented by a block 50 of a first color, such as red. The icon 48 may also include additional products not owned by the current customer, with each of these products being represented by a block 50 of a different color based upon one or more factors, such as the perceived propensity of the customer to purchase the product, as determined by the data analysis tools 24. Thus, for example, products for which there is a high propensity that the customer will purchase the product may be represented as blocks of a first color such as green, while products which have a medium purchase propensity may be represented as blocks of a different color, such as orange, and products having a low purchase propensity may be represented as blocks of yet an additional color, such as white. Distinguishing between the product images 50 in the tool-bar icon by distinctive colors enables a customer service representative to quickly assimilate the customer's information to determine whether pursuing additional information about the customer, or extending the contact with the customer, is desirable. For example, if the representative looks at the icon 48 and sees a number of green blocks, then the representative may decide to spend additional time with the customer or to offer a special rate to the customer. However, if the representative looks at the icon 48 and sees a number of white blocks, the representative may decide to forego a sales pitch and proceed to the next customer. In this manner, the representative may develop a sales strategy instantly, without having to read through lines or screens of text. The particular colors in which to display the product images 50, as well as the purchase propensity ranges to be associated with each color or other visual criteria may be established by a marketing analyst through the Builder Service 40.

Figure 4:
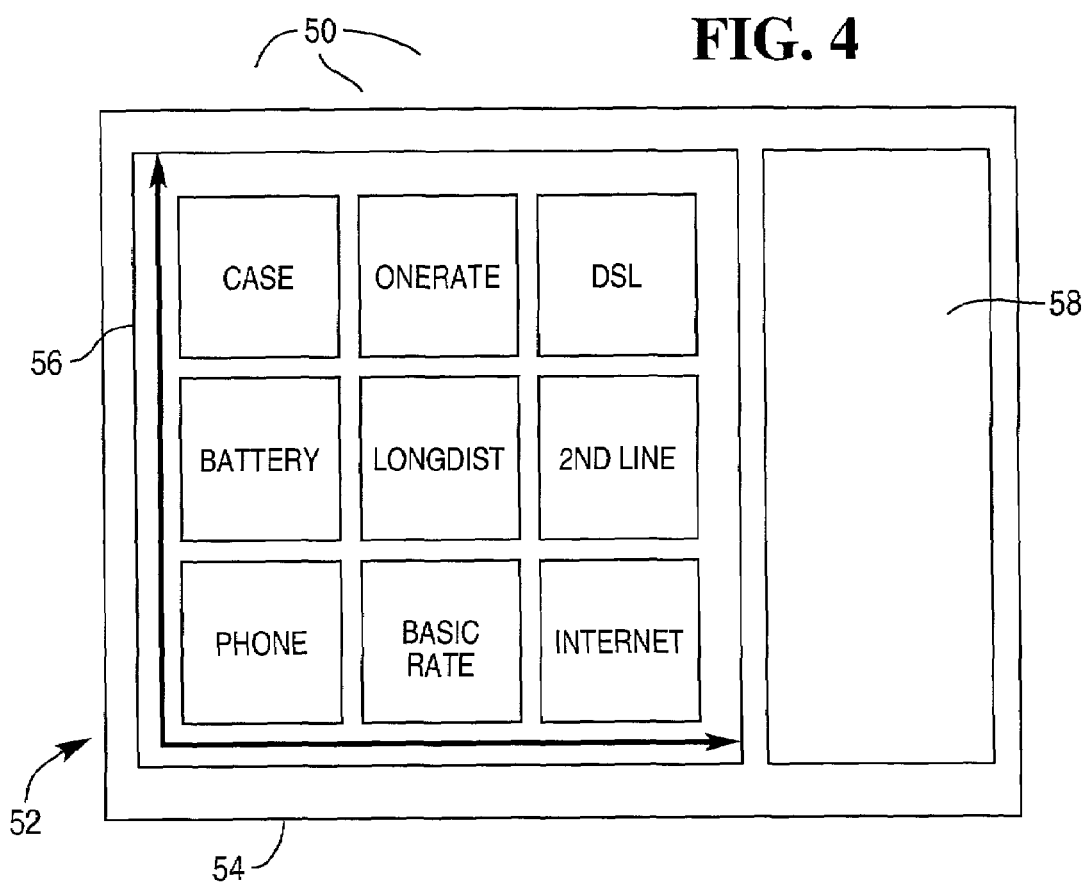
FIG. 4 is an exemplary screen display of a representative, graphical customer purchase profile in accordance with the present invention.

Based upon the information depicted in the tool-bar icon 48, the representative may select the icon, in the same manner that the other workstation assistant buttons 44 are selected, in order to view a larger, more complete summary of the customer's product purchasing profile. FIG. 4 depicts an exemplary screen display 52 of a more detailed graphical representation 53 of this profile in accordance with the present invention. As shown in FIG. 4, the graphical representation 53 includes a two-dimensional mapping of a set of product images 50, in which each of the images corresponds to a product or service. Preferably, the product images 50 are represented in the display 52 by the same colors, or other visual criteria as in the tool-bar icon 48. Accordingly, blocks 60 and 62 are depicted in white, block 64 is depicted in orange, block 66 is depicted in green, and blocks 68-76 are depicted in red. Additionally, if the workstation 34 does not include a color display screen, the blocks 60-76 may be depicted in various shades of gray scale, in order to distinguish between the product images. In addition to distinguishing between the product images 50 by color, each of the product images may be designated by a text name, such as shown or, alternatively, by a pictorial image.

In addition to being represented by various colors, each of the product images 50 in the graphical representation 53 is preferably mapped according to a predetermined relationship between the represented products. Products that are related by a first factor, such as functional completeness, are mapped or aligned in a first direction in order to provide the representative with a quick view of potential cross-sell opportunities for the products. Similarly, products that are related in terms of a second factor, such as product class, quality, level or value are aligned in a second direction, in order to provide the representative with a quick view of potential up-sell opportunities. In the embodiment shown, products related by functional completeness (i.e. for cross-sell opportunities) are mapped along the horizontal axis 54, while products related by class, quality or value are mapped along the vertical axis 56. The inter-product relationships depicted along the axes 54, 56 are preferably predetermined for each contacted customer using one or more data analysis tools 24. These predetermined relationships are accessed and displayed in real-time by the CPM server 32 at the initiation of the customer contact.

Figure 5:
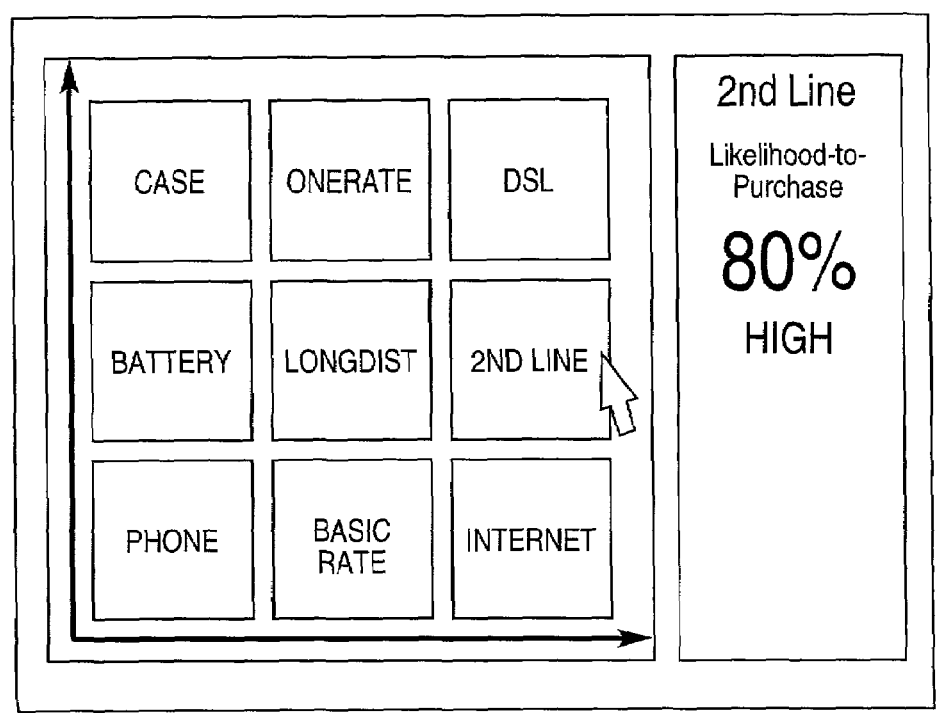
FIG. 5 is an exemplary screen display similar to FIG. 4, depicting product messaging on a display screen.

As shown in FIG. 4, a display area 58 is preferably provided alongside the map of product images in order to display scripts or other pertinent product sales information to the representative. While the product images 50 are depicted on the workstation screen 34, the representative may obtain additional information regarding the displayed products by "hovering-over" selected images using a mouse or other indicating device 78, as shown in FIG. 5. As a particular product image is hovered over in this manner, additional information regarding the product may be shown in display area 58. For example, as shown in FIG. 5, hovering over an image such as the "2nd Line" product image 66, changes the display 58 to display text regarding the depicted product, as well as the purchase propensity score corresponding to the product. In this manner, the representative is provided with a confirmation of the propensity data previously indicated by color or other visual characteristic in the display 52, as well as additional information regarding the represented product.

In addition to hovering over a product image 50, a representative may select an image, using the indicating device 78, in order to launch a sales script tailored to the particular product and/or the customer's market segment. As mentioned above, these personalized sales scripts may be developed by market analysts and stored in the CPM database 36 for access when a customer in the designated segment or meeting the selected criteria is contacted. These scripts may be shown to the representative on display screen 58 or, alternatively, a separate display screen or window may be provided for depicting the script.

Figure 6:
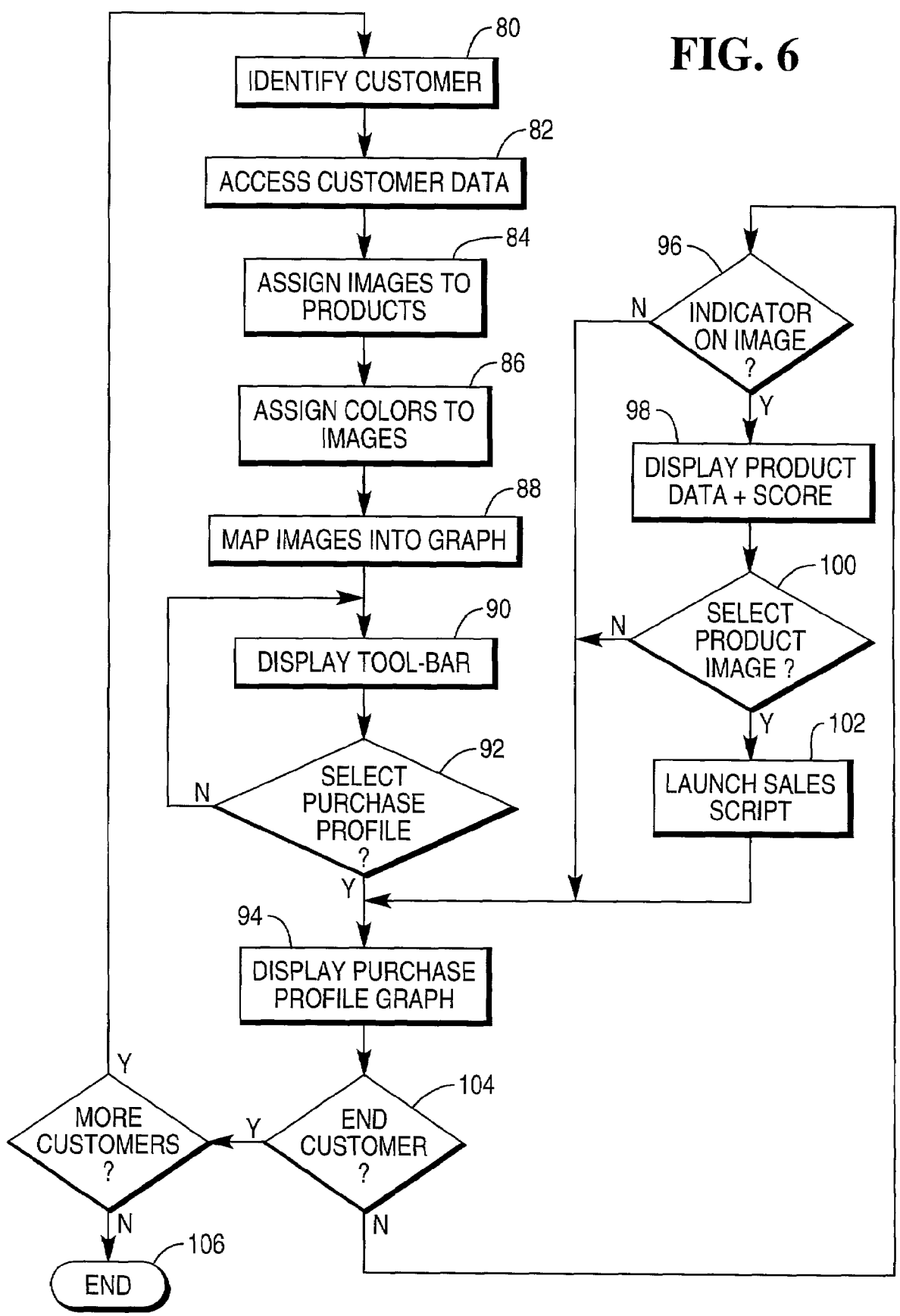
FIG. 6 is a flow diagram of the processing steps followed by the system illustrated in FIG. 1, in formatting and displaying a customer purchase profile.

FIG. 6 is a flow diagram depicting one embodiment of a method for graphically representing a product purchase profile according to the present invention. As mentioned above, prior to initiating customer contacts data analysis tools are applied against customer databases and other internal data stores in order to develop personalized data records corresponding to each of the potential customer contacts. In addition, a customer personalization application is preferably launched on a representative's workstation. After the personalization application is established on the workstation, a customer is identified as shown at step 80, either through a calling campaign, or through a customer initiated contact, such as an in-store visit. After the customer has been identified, one or more data records or fields associated with the customer are accessed at step 82 from the data warehouse 28, using a customer id or other key field. Additionally, information regarding products owned by the customer and other related products is also accessed from the data warehouse 28.

At step 84, an image or block 50 is assigned to each of the products accessed from the data warehouse 28. Information regarding product ownership and purchase propensity of the customer for each of the identified products is then accessed and used to assign colors to each of the product images at step 86. At step 88, each of the product images is mapped into a two-dimensional graphical display according to the previously determined inter-product relationships. The two-dimensional product image display is then incorporated into the personalization application tool-bar along with one or more agent assistant icons, and displayed through the personalization application at step 90, as contact with the customer is being initiated, in the case of an outbound call campaign, or during the initial stages of customer interaction in a customer initiated contact.

After the tool-bar is displayed, the process waits at step 92 for action from the representative in selecting one of the icons of the tool-bar. If the representative selects the purchase profile icon at step 92, then the product ownership profile graph is launched by the personalization application at step 94, providing a more detailed view of the customer's product ownership profile, purchase propensities and inter-product relationships. If the representative selects a different icon at step 94, then the application launches a sales offer corresponding to that icon or provides other types of customer data corresponding to the selected icon. At step 104, a check is made as to whether the representative has completed contact with the identified customer. If the representative has completed contact with the present customer, then control of the application either passes back to step 80, in order to identify the next customer and begin a new customer interaction, or alternatively, the application terminates at step 106, if customer contacts are complete.

If the representative is still interacting with the present customer, then the process looks for movement by the indicating device on the individual product images at step 96. If the indicating device moves over a product image, then at step 98 the application displays information regarding the represented product on the display screen 58. In addition, at step 100, the application determines whether the representative has selected the particular product image that the indicating device is hovering over. If the product image has been selected, then at step 102 a sales script corresponding to the selected image is launched by the application. If the product image has not been selected, then the application continues displaying the purchase profile graph at step 94 until either interaction with the customer is complete, the representative returns to the tool-bar (not shown) or the indicating device is moved so as to hover over a different product image. When either of these actions occur, the process proceeds as described above until contact with the identified customers is complete.

The present invention thus provides methods and systems usable in an automated customer relationship management application for capturing all of the elements of product ownership, inter-product relationships of value and completeness, and purchase propensity for a current customer contact into a single graphical display. This synopsis of customer information into a single graphical display enables a customer service representative to assimilate at-a-glance a complete picture of the customer's purchasing status and sales opportunities, to thereby increase the efficiency of the sales representative and enable the representative to quickly determine the most appropriate sales approach to pursue with the customer. While the invention has been described herein with respect to its use in the InterRelate+™ application, the invention may be applied to any customer personalization or relationship management software application in which it is desired to quickly provide a customer service or business representative with a snap-shot glance of a customer's purchasing behavior and purchasing history with the business, without departing from the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method of representing a customer's product purchasing profile to a customer service representative in an automated customer relationship management environment, said method comprising the steps of:
   identifying a set of products for a sales campaign;
   identifying one or more relationships between products within said set of products, said step of identifying one or more relationships between said products includes distinguishing from within said product set, products owned by said customer;
   representing each product from within said set by a distinct image in a graphical display;
   identifying one or more demographic factors associated with said customer;
   determining a propensity of said customer to purchase each of one or more unowned products in said product set from said one or more demographic factors; and
   using said determined purchase propensity to visually distinguish between said product images in said graphical display.

2. The method of claim 1, further comprising the step of distinguishing between different levels of purchase propensity by different visual criteria.

3. The method of claim 1, wherein said graphical display is an icon in a toolbar associated with a customer personalization software application.

4. The method of claim 3, wherein selecting said toolbar icon displays a graphical representation of said product purchasing profile on a customer service representative's workstation screen.

5. The method of claim 1 wherein said product images are visually distinguished by color.

6. The method of claim 1, further comprising the step of mapping each of said product images into a two-dimensional graphical display according to one or more inter-product relationships.

7. The method of claim 6, wherein said product images are arranged in a first dimension according to cross-sell potential and in a second dimension according to up-sell potential.

8. The method of claim 1, further comprising the steps of:
   selecting a product image from said graphical display; and
   launching a sales script for said customer service representative corresponding to said selected product image.

9. A method of graphically representing product purchase profiles and sales guidance to a customer service representative in an automated customer relationship management environment, said method comprising the steps of:
   identifying a customer, said customer being associated with one or more demographic attributes;
   accessing purchasing data for said customer from a data store, said purchasing data including products owned by said customer and products related by one or more criteria to said owned products;
   determining a propensity of said customer to purchase each of said related products based upon one or more of said demographic attributes;
   representing each of said owned and related products by a visual image;
   mapping said product images into a graphical display; and
   visually distinguishing between said product images in said display based upon said purchase propensity.

10. The method of claim 9, further comprising the steps of:
    selecting a product image from said graphical display; and
    launching a sales script for said customer service representative corresponding to said selected product image.

11. The method of claim 9, wherein said step of visually distinguishing between said product images comprises identifying different product images by different colors.

12. The method of claim 9, wherein said mapping step further comprises organizing each of said owned and related products in a two-dimensional graphical display according to inter-product relationships between the products.

13. The method of claim 12, wherein said products are organized in a first dimension according to cross-sell potential and in a second dimension according to up-sell potential.

14. A computerized system for graphically representing a customer's product purchase profile and sales guidance to a customer service representative in an automated customer relationship management environment, said system comprising:
    a workstation display screen;
    a plurality of images on said display screen representing products owned by said customer and products related by one or more criteria to said owned products, said product images being mapped into a two-dimensional graphical display;
    a personalization application comprising executable instructions for:
       identifying a customer, said customer being associated with one or more demographic attributes;
       accessing purchasing data for said customer from a data store, said purchasing data including products owned by said customer and products related by one or more criteria to said owned products;
       determining a propensity of said customer to purchase each of said related products based upon one or more of said demographic attributes; and
       mapping said product images into said two-dimensional graphical display according to one or more inter-product relationships;
    an indicating device moveable between said product images on said display screen; and
    one or more distinct visual criteria in which to depict said product images in order to distinguish between said products, said product images being depicted by said one or more distinct visual criteria according to a propensity of said customer to purchase each of said products.

15. The system of claim 14, wherein said personalization application maps said product images in a first dimension according to an up-sell relationship and in a second dimension according to a cross-sell relationship.

16. The system of claim 14, wherein said personalization application generates one or more sales scripts for said customer service representative depending on a position of said indicating device on said product images.

17. The system of claim 14, further comprising a builder service including executable instructions for associating a distinct visual criteria with each of one or more purchase propensity levels.

* * * * *